(No Model.)
N. WASHBURN.
CAR WHEEL.
No. 351,232. Patented Oct. 19, 1886.
Fig. 1.
Fig. 2.
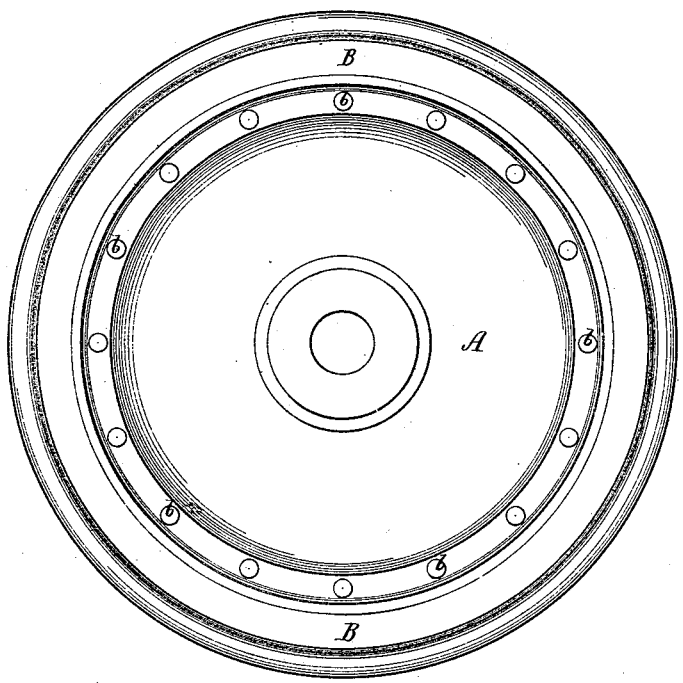
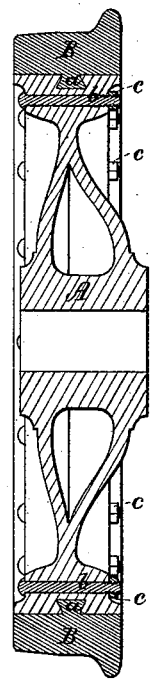
Witnesses.
S. N. Piper
Wm. B. Torrey.
Inventor.
Nathan Washburn.
by R. H. Eddy atty.

UNITED STATES PATENT OFFICE.

NATHAN WASHBURN, OF ALLSTON, MASSACHUSETTS.

CAR-WHEEL.

SPECIFICATION forming part of Letters Patent No. 351,232, dated October 19, 1886.

Application filed June 24, 1886. Serial No. 206,072. (No model.)

*To all whom it may concern:*

Be it known that I, NATHAN WASHBURN, of Allston, in the county of Suffolk, of the Commonwealth of Massachusetts, have invented a new and useful Improvement in Railway-Car Wheels; and I do hereby declare the same to be described in the following specification, and represented in the accompanying drawings, of which—

Figure 1 is a side elevation, and Fig. 2 a transverse and median section, of a wheel of my invention, the nature of which is defined in the claim hereinafter presented.

In this wheel the tire, which is of cast-steel, is provided with a continuous rib, dovetailed in transverse section and extending from the inner periphery of such tire, and the body of the wheel is in one piece of metal, cast against such periphery and about the rib and welded thereto, and there is a series of wrought-iron bolts arranged in and going transversely through the solid rim of the wheel, and having nuts screwed on them, the unheaded ends of the bolts being upset upon the nuts; or, instead of such nuts to the bolts, washers (like the bolt-heads in shape) may be placed on the bolts, and the ends of the latter be upset upon the washers. It is preferable, however, to have the bolts and nuts screw-threaded, for the nuts to screw upon the bolts. In some cases rivets may be substituted for bolts.

I would observe that I am aware that it is not new to make the steel tire of a car-wheel with a continuous rib extending from the inner periphery of it and dovetailed in transverse section, in which case the body of the wheel was cast in two sections, separate from each other and the tire, and abutting together in the median plane of the wheel and held to the tire by screw-bolts going through both sections, and provided with nuts screwed upon them, the said bolts, in which case the rim of the wheel was in two sections, whereas in my present wheel it is in one solid piece integral with the rest of the body, the bolts being to prevent such rim from cracking and separating from the tire.

In manufacturing the wheel the tire, heated to a very high temperature—that is, nearly or quite to a "white-heat"—is laid in the mold for forming the body, the metal or iron to constitute the body being subsequently cast within the mold and against the tire, so as to weld thereto or unite with it on its inner periphery and dovetailed rib.

In the drawings, A denotes the cast-metal body of the wheel; B, the steel tire; $a$, the dovetailed rib; $b\ b\ b$, &c., the screw-bolts, and $c\ c\ c$, &c., the nuts screwed upon such bolts, all being arranged as represented.

I claim—

The improved railway-car wheel, substantially as described, consisting of a steel tire provided with a continuous dovetailed rib extending from its inner periphery, a metallic body cast in one entire piece against and welded to the tire and its rib in the process of casting the body, and a series of headed bolts going through the rim transversely and secured therein by nuts, or means substantially as set forth.

NATHAN WASHBURN.

Witnesses:
R. H. EDDY,
R. B. TORREY.